Oct. 11, 1955    G. W. NEELY    2,720,224
LAMINATED PLASTIC SHUTTLE
Filed April 16, 1952

INVENTOR.
GLEN W. NEELY,
BY Allen & Allen
ATTORNEYS.

United States Patent Office 2,720,224
Patented Oct. 11, 1955

2,720,224

LAMINATED PLASTIC SHUTTLE

Glen W. Neely, Oak Park, Ill., assignor to The Richardson Company, Lockland, Cincinnati, Ohio, a corporation of Ohio Application April 16, 1952, Serial No. 282,583

4 Claims. (Cl. 139—196)

My invention relates to a laminated plastic shuttle for use in the textile industry in weaving to pass the thread of the woof from one edge of the cloth to the other between the threads of the warp.

A shuttle comprises essentially an elongated body having a cavity therein for the insertion of a yarn carrying bobbin, the bobbin being mounted in the body cavity by means of suitable hardware. The shuttle also includes a yarn guide or eye to control the distribution of the yarn as the shuttle travels across the loom. As currently manufactured, the shuttle bodies are made of wood, such as dogwood or persimmon, and the ends of the wooden bodies are protected by noses or tips which are generally made of steel.

While wooden shuttles have been used in the industry for a great number of years, there are a number of disadvantages inherent in the use of wooden shuttles. By nature, wood is not a uniform product and it tends to split or splinter in service, which results in breaks or damage to the threads or yarn being woven. The splintering or fracturing of the wood also develops sharp edges and points which may cause injury to the operator or other person attempting to replace a damaged shuttle. Furthermore, when a "crack" starts in a wooden shuttle, it goes completely to the end of the part—due to the grain structure of the wood—and completely destroys its usefulness, and may influence its line of flight in such a way as to become a hazard to personnel working with or near the loom. Another serious disadvantage of wooden shuttles is the high cost of production. Because of imperfections inherent in wood, there is a large waste in raw blanks, and in processing some of these imperfections are so hidden that they do not become apparent until part or all of the machining is done or even until the part is in service. Since the production of a wooden shuttle may require as many as ninety operations, the production cost is high, and when allowance is made for rejects, it becomes even higher. Coupled with this, the life of a wooden shuttle under normal operating conditions is approximately sixty days (twenty-four hour day), and under best conditions, ninety days. In addition, humidity conditions may seriously affect a wooden shuttle. Changes in humidity may cause the surface of the shuttle to become rough through raising of the wood fiber, and yarn contacting the shuttle may be damaged or broken. Also, with wood there is a tendency for the bolts and other hardware used in connection with the bobbin and the eye to become loose and hence dangerous or become inoperative.

It is a principal object of my invention to provide an improved shuttle having a plastic body which is not subject to the disadvantages enumerated above.

It is a further object of my invention to provide a shuttle body composed of material having sufficiently high bond strength to practically eliminate splitting and splintering of the shuttle body when in service.

A further object of my invention is the provision of a shuttle structure in which waste of blank parts in process of manufacture is almost completely eliminated.

Yet another object of my invention is the provision of a shuttle body which can be manufactured economically in that a large percentage of the machine operations inherent in the formation of wooden shuttle bodies are eliminated.

Yet another object of my invention is the provision of a shuttle, the life of which exceeds many times the life of a wooden shuttle.

These and other objects of my invention which will appear hereinafter or will be apparent to one skilled in the art upon reading this specification, I accomplish by that construction and arrangement of parts of which I shall now describe an exemplary embodiment.

Reference is made to the accompanying drawings wherein.

In the practice of my invention, I provide a laminated plastic body made up of resin-impregnated material plied to desired thickness and consolidated by heat and pressure. The plastic material may be formed in sheets which are then cut to blank size and machined to proper form, or the laminating material may be tailored into pre-forms for incorporation into a suitable mold and consolidated by plastic molding technique.

Figure 6:
Figure 6 is an enlarged, fragmentary perspective view of a web of non-oriented fibers employed in the formation of my plastic shuttle body.

The base material 1 (Figure 6) consists of "non-woven" fabric which is matted fiber held together with sufficient binder to give the material sufficient strength to hold together during saturating, cutting and molding or laminating operations. The fibers are non-oriented in that they are dispersed in such a manner as to give practically equal strength in all directions. This effect can be obtained by blowing the fibers down on a moving screen, the fibers being felted-out on the screen and held together by a resin, usually a water soluble resin. Water soluble resins which may be used as the binder include polyvinyl alcohol, methyl cellulose, carboxy methyl cellulose and casein, as well as others which will be known to the skilled worker in the art. The fibers may be cotton, synthetic fibers, a mixture of cotton and synthetic fibers, or inorganic fibers such as glass and asbestos, and the base material should preferably contain a considerable amount of long fibers—having a length of from one to one and one-eighth inches in order to have the required strength, but some advantages in uniformity may be attained by including sufficient short fibers, such as linters, to fill voids between long fibers. Fibers which are greater than one and one-eighth inches in length may be employed, particularly where synthetic or inorganic fibers are used.

To form the base material into shuttle bodies, the base material is next treated with a resin binder and a plurality of plies of the material laminated together. A web of the material can be first saturated with the binder by carrying the web through a bath of the binder and thereafter drying the impregnated web in accordance with conventional practices in the art. The saturated web is then cut to proper sheet size, the sheets plied to desired thickness and consolidated in a hydraulic press by conventional laminating technique. If the shuttle body blanks are to be formed by plastic molding technique, the saturated base material can be pre-cut in a punch press for incorporation in a mold of a suitable size and then consolidated in the usual manner of plastic molding technique. Alternatively, it may be desirable to form the web as described above, cut and load the web material into the mold together with sufficient resin to bind the laminations together, then apply the necessary heat and pressure to consolidate the material.

The resin content of the impregnated base material may vary from approximately 40% to approximately 65% of the total weight of the treated material, depending on the structure of the mat, the flow properties of the varnish and the hydraulic pressure available for molding or laminating.

The resin used may be either thermoplastic or thermosetting. Examples of thermoplastic resins which may be used are ethyl cellulose and vinyl polymers and copolymers such as vinyl chloride or vinyl chloride-acetate. Examples of thermosetting resins are polyesters and condensation products of phenol and/or its homologues with aldehydes such as formaldehyde, formaldehyde yielding compounds or furfural.

An important feature in the production of my laminated plastic shuttle body is in the positioning of the plied webs. To form a successful shuttle body, I have found that the plied webs must extend parallel to the top and bottom of the shuttle body. In other words, the laminations of the shuttle body must be normal to the sides and ends of the bobbin cavity. Thus, with reference to Figures 1 and 2 of the drawings, the shuttle body 2, has a top 3, a bottom 4, and sides 5 and 6. The bobbin cavity 7 extends through the body 2 from top toward the bottom thereof, and the body is additionally provided with a recess 8 for the bobbin attaching hardware and a recess 9 at the opposite end for the eye.

Figure 1:
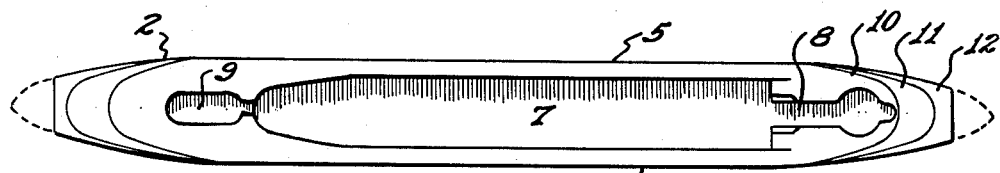
Figure 1 is a plan view of a shuttle body made in accordance with my invention.

The body 2 is formed of a plurality of plies of web material, such as the plies 10, 11 and 12 which have been consolidated as indicated above. This is true whether the shuttle body is fabricated from a laminated sheet as illustrated in Figures 1 and 2, or whether it is molded from pre-cut blanks, as illustrated in Figure 4, wherein the ends of the laminations 14, 15 and 16 are compressed in the mold, their original condition being illustrated by the dotted lines 17.

Figure 2:
Figure 2 is a side elevation of the structure illustrated in Figure 1.
Figure 4:
Figure 4 is a side elevational view similar to Figure 2 of a modified form of my invention.
Figure 3:
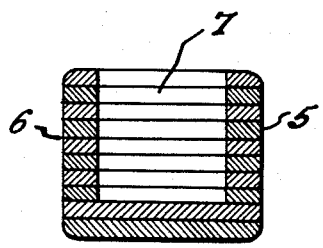
Figure 3 is a sectional view taken along the lines 3—3 of Figure 2.
Figure 5:
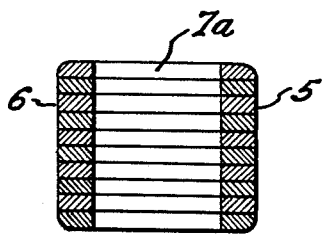
Figure 5 is a sectional view taken along lines 5—5 of Figure 4.

The shuttle bobbin cavity 7 may extend only partially through the shuttle body, as illustrated in Figures 2 and 3, or it may extend completely through the shuttle body, as illustrated at 7a in Figures 4 and 5. In either event, the bobbin cavity may be machined from the rough blanks, or it may be pre-formed, particularly where pre-cut laminations are loaded in the mold prior to lamination.

When the shuttle body is formed with the laminations arranged normal to the bobbin cavity, the shuttle body resists stress in service wherever applied and is not affected by residual stresses due to an unbalanced construction. I have found that this is not true where the shuttle body is formed with the laminations paralleling the side walls of the bobbin cavity. When a shuttle body is made with the laminations parallel to the sides of the cavity, the shuttle falls between lamination in the planes of those sides, particularly at the ends of the bobbin cavity.

I have also found that it is important to employ non-oriented web material as opposed to a woven web or fabric. The non-oriented material gives higher physical strength than woven webs since the fibers are substantially straight and not twisted or curled to the extent they are when made into a woven fabric. In addition, I have found that non-woven fabric results in a balance of strength in all directions; whereas, a woven fabric results in an unbalanced structure, being influenced by the methods of weaving, particularly in a wall area between the bobbin cavity and the sides of the shuttle, and this creates warping and distortion in these parts which results in failure of the shuttle. I have found, however, that by plying non-oriented web material in the manner indicated, the resulting shuttle body is of uniform texture and free of internal stresses. It will not warp or distort while being machined.

The construction of a shuttle body in accordance with my invention results in a shuttle which is uniform in strength and density, has higher strength than wood, greater resistance to abrasion or damage than wood, has a higher strength-weight ratio than most metals, can be fabricated by standard machining methods, and is not adversely affected by temperature or humidity conditions prevalent in a weaving room. Also, the uniformity and hardness of the material and its resistance to abrasion permits the shuttle designer to utilize the shuttle body into functioning entirely or partly as the yarn guide or eye of the shuttle, thus removing metal parts and resulting in a further weight reduction. The dimensional stability of the plastic body permits accurate fabrication and permanent retention of hardware.

Modifications may be made in my invention without departing from the spirit of it. Having, however, described an exemplary embodiment of my invention, what I desire to secure and protect by Letters Patent is:

1. A one-piece shuttle body formed in its entirety from plies of non-oriented fibres laminated together by means of a resin binder, said body having a longitudinally extending bobbin cavity therein spaced from the sides and ends of said body and extending downwardly from the top surface thereof, said body being formed with the plies of non-oriented fibres extending parallel to the top and bottom surfaces of said body and lying at substantially right angles to the sides of the bobbin cavity, whereby to provide a balanced structure adapted to resist stresses wherever applied.

2. The structure claimed in claim 1 wherein the plies of non-oriented fibres are impregnated with a resin binder, the resin contents of the impregnated plies being approximately 45% to approximately 65% of the total weight of the treated plies.

3. The structure claimed in claim 2 wherein the resin binder comprises a thermoplastic binder.

4. The structure claimed in claim 2 wherein the resin binder comprises a thermosetting binder.

References Cited in the file of this patent

UNITED STATES PATENTS

| | | |
|---|---|---|
| 1,805,090 | Hills | May 12, 1931 |
| 1,861,593 | Christoph | June 7, 1932 |
| 2,445,899 | Williams | July 27, 1948 |

FOREIGN PATENTS

| | | |
|---|---|---|
| 4,393 | Great Britain | of 1876 |
| 307,032 | Great Britain | Sept. 12, 1929 |
| 294,811 | Italy | Apr. 5, 1932 |
| 328,081 | Italy | July 26, 1935 |